United States Patent [19]

Komine et al.

[11] Patent Number: 4,852,407
[45] Date of Patent: Aug. 1, 1989

[54] METHOD AND APPARATUS FOR DETERMINING LENGTH OF PIPE UTILIZING SOUND WAVES

[75] Inventors: Isamu Komine; Masataka Kobayashi; Shiro Ariga, all of Tokyo, Japan

[73] Assignee: Nippon Kokan Kabushiki Kaisha, Tokyo, Japan

[21] Appl. No.: 200,764

[22] Filed: May 31, 1988

[30] Foreign Application Priority Data

Jun. 24, 1987 [JP] Japan ................................. 62-155531
May 20, 1988 [JP] Japan ................................. 63-124291

[51] Int. Cl.4 ........................................... G01N 29/04
[52] U.S. Cl. ...................................... 73/597; 367/903
[58] Field of Search ................... 73/597, 602; 367/99, 367/118, 127, 902, 903, 908, 128

[56] References Cited

U.S. PATENT DOCUMENTS 4,234,942 11/1980 Prause et al. .......................... 367/128
4,241,430 12/1980 Kayem et al. ......................... 367/115
4,494,224 1/1985 Morrell et al. ........................ 367/99
4,584,676 4/1986 Newman ............................... 73/597

Primary Examiner—Stewart J. Levy
Assistant Examiner—Louis M. Arana
Attorney, Agent, or Firm—Frishauf, Holtz, Goodman & Woodward

[57] ABSTRACT

A method and an apparatus for determining a length of a pipe utilizing sound waves, which comprise: transmitting sound waves having a prescribed frequency and a prescribed transmission intensity toward the interior of a pipe at one end thereof by an oscillator; receiving the thus transmitted sound waves at the other end of the pipe by a receiver; measuring a propagation time required for the sound waves to pass through the air in the pipe from the one end to the other end thereof by a clock; and determining a length of the pipe by a length calculator on the basis of a predetermined propagation velocity of the sound waves in the air in the pipe and the thus measured propagation time of the sound waves.

6 Claims, 5 Drawing Sheets

METHOD AND APPARATUS FOR DETERMINING LENGTH OF PIPE UTILIZING SOUND WAVES

FIELD OF THE INVENTION

The present invention relates to a method and an apparatus for determining a length of a pipe utilizing sound waves.

BACKGROUND OF THE INVENTION

The consumption of plastic pipes such as polyethylene pipes for gas and water supply piping is gradually increasing. Of these plastic pipes, ones with a diameter of from 8 to 50 mm are shipped in the form of a coil of a prescribed length. For this purpose it is the usual practice to measure the length of a plastic pipe by means of a measuring roll while winding the plastic pipe into a coil and cut the plastic pipe into a prescribed length in the final stage of the manufacturing process.

In the above-mentioned measurement of length of a plastic pipe by means of a measuring roll, the measured value of length varies depending upon changes in the pressure of the measuring roll applied onto the plastic pipe surface, changes in the travelling speed of the plastic pipe, deformation of the plastic pipe under the pressure of the measuring roll, or the difference in the surface condition of the plastic pipe, and this causes the decrease in the measuring accuracy. Furthermore, since the length of a plastic pipe varies under the effect of the temperature, improvement of the measuring accuracy requires measurement indoors at a certain temperature of 23°±2° C., for example, but this is very difficult in terms of equipment.

To ensure a prescribed length of the shipped plastic pipe, therefore, it is a common practice to wind a plastic pipe into a coil slightly longer than the prescribed length as well as to sample a coil at random to actually measure the length of the uncoiled plastic pipe by means of a measuring tape, for example. It is not however easy to uncoil a coiled plastic pipe and measure the length thereof by means of a measuring tape or the like, requiring much time.

There is also known another method for determining a length of a plastic pipe, which comprises: measuring a total weight and dimensions of the cross-sectional area of a coiled plastic pipe, and determining a length of the plastic pipe on the basis of the total weight and the dimensions of the cross-sectional area thus measured of the plastic pipe and the density of the material of the plastic pipe. However, the above-described method, not being an actual measurement of the length of the plastic pipe, has only a low accuracy and permits only rough inspection of the length of the coiled plastic pipe as a sampling check.

Under such circumstances, there is a demand for the development of a method and an apparatus for determining a length of a pipe utilizing sound waves, which permit easy measurement at a high accuracy of the length of any of various pipes such as a plastic pipe irrespective of whether the pipe is straight or wound into a coil, but a method and an apparatus having such properties have not as yet been proposed.

SUMMARY OF THE INVENTION

An object of the present invention is therefore to provide a method and an apparatus for determining a length of a pipe utilizing sound waves, which permit easy measurement at a high accuracy of the length of any of various pipes such as a plastic pipe irrespective of whether the pipe is straight or wound into a coil.

In accordance with one of the features of the present invention, there is provided a method for determining a length of a pipe utilizing sound waves, which comprises the steps of:

transmitting sound waves having a prescribed frequency and a prescribed transmission intensity toward the interior of a pipe at one end thereof;

receiving said transmitted sound waves at the other end of said pipe;

measuring a propagation time required for said sound waves to pass through the air in said pipe from said one end to said other end thereof; and determining a length of said pipe on the basis of a predetermined propagation velocity of said sound waves in the air in said pipe and said measured propagation time of said sound waves.

In accordance with a first aspect of the invention, the frequency of the sound waves transmitted toward the interior of the pipe is digitally and intermittently reduced, while the transmission intensity of the sound waves is kept constant. The frequency of the sound waves is selected and transmitted toward the interior of the pipe so that a receiving intensity of the sound waves at the other end of the pipe fall within the range of prescribed receiving intensity.

According to another aspect of the invention, the sound waves transmitted toward the interior of the pipe are digitally and intermittently increased in transmission intensity, while the frequency of the sound waves is kept constant. The transmission intensity of the sound waves transmitted towards the interior of the pipe is selected so that a receiving intensity of the sound waves at the other end of the pipe fall within a range of a prescribed receiving intensity.

The invention also includes apparatus for carrying out the above methods.

DETAILED DESCRIPTION OF PREFERRED EMBODIMENTS

From the above-mentioned point of view, extensive studies were carried out to develop a method and an apparatus for determining a length of a pipe utilizing sound waves, which permit easy determination at a high accuracy of the length of any of various pipes such as a plastic pipe irrespective of whether the pipe is straight or wound into a coil. As a result, the following finding was obtained.

Figure 4:
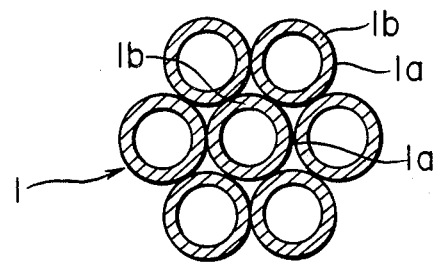
FIG. 4 is a cross-sectional view illustrating a pipe wound into a coil.

More particularly, when transmitting sound waves toward the interior of a pipe at one end thereof, the large difference in sound impedance between the air in the pipe and the pipe wall makes it difficult for the sound waves to leak into the pipe wall, resulting in a very slight amount of the sound waves leaking into the pipe wall, and the amount of the sound waves released again into the interior of the pipe after leakage into the pipe wall is further smaller. Therefore, the sound waves having leaked into the pipe wall do not act as a noise at the other end of the pipe relative to the sound waves having propagated through the air in the pipe. When a pipe is wound into a coil, as shown in FIG. 4, which illustrates a cross-sectional view of a pipe wound into a coil, contact between the pipe walls 1b of two adjacent pipe portions 1a of the pipe 1 is almost along a line with a very small contact area. Consequently, the sound waves having leaked from the interior of one of the pipe portions 1a into the pipe wall 1b thereof are hardly propagated into the pipe wall 1b of the other pipe portion 1a, resulting in a very slight amount of propagated sound waves. When the pipe 1 is wound into a coil, therefore, sound waves propagating between the pipe walls 1b of the two adjacent pipe portions 1a disappear halfway and do not act as a noise at the other end of the pipe 1 relative to the sound waves having propagated through the air in the pipe 1. For these reasons, by transmitting the sound waves toward the interior of a pipe at one end thereof and receiving the thus transmitted sound waves at the other end of the pipe to measure a propagation time required for the sound waves to pass through the air in the pipe from the one end to the other end thereof, it is possible to easily determine a length of the pipe at a high accuracy irrespective of whether the pipe is straight or wound into a coil.

The present invention was made on the basis of the above-mentioned finding. Now, the method and the apparatus for determining a length of a pipe utilizing sound waves of the present invention are described below in detail with reference to the drawings.

Figure 1:
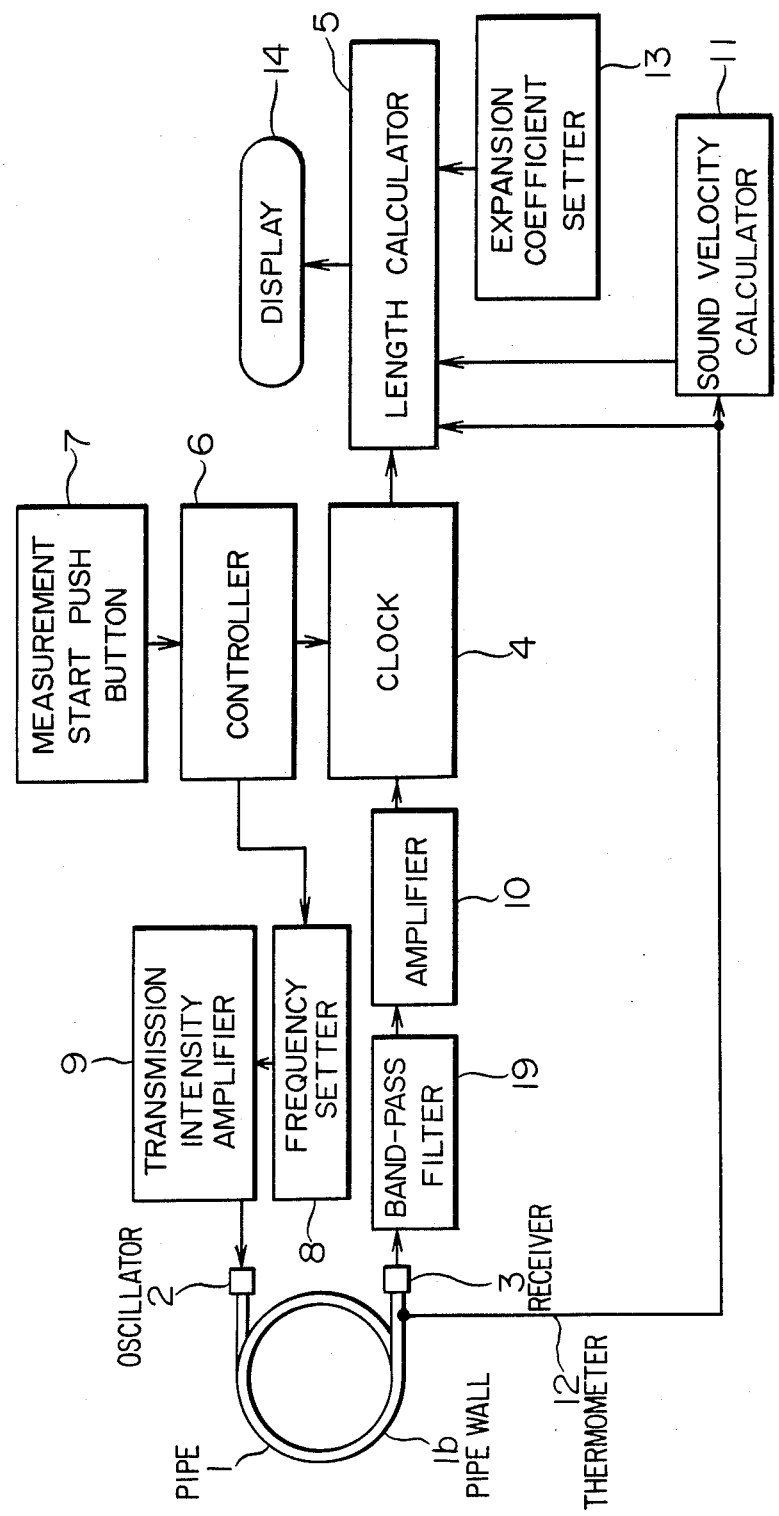
FIG. 1 is a block diagram illustrating the structure of a first embodiment of the apparatus of the present invention for determining a length of a pipe utilizing sound waves.

FIG. 1 is a block diagram illustrating the structure of a first embodiment of the apparatus of the present invention for determining a length of a pipe utilizing sound waves. As shown in FIG. 1, the apparatus of the first embodiment of the present invention basically comprises an oscillator 2, a frequency setter 8, a transmission intensity amplifier 9, a receiver 3, a clock 4 and a length calculator 5, and is furthermore provided with a controller 6, a measurement start push button 7, an amplifier 10, a sound velocity calculator 11, a thermometer 12, an expansion coefficient setter 13 and a display 14.

The controller 6 generates various control signals including a sound wave generation timing signal to control actions of the various parts of the apparatus for determining a length of a pipe. The measurement start push button 7 generates a trigger, i.e., a signal for starting measurement so that determination of the length of the pipe 1 is started by pushing this push button.

The frequency setter 8 generates an electric signal for causing the oscillator 2 to transmit sound waves. The frequency and the waveform of the sound waves to be transmitted from the oscillator 2 are set by the frequency setter 8. The frequency setter 8 generates an electric signal for a certain period of time, for 0.2 seconds for example, in synchronization with the positive edge of the sound wave generation timing signal from the controller 6, thereby causing the oscillator 2 to transmit the sound waves toward the interior of the pipe 1 for a certain period of time as described above starting from the positive edge of the sound wave generation timing signal.

The frequency of the sound waves to be transmitted by the oscillator 2 may be appropriately set, taking into account the attenuation of sound waves in the pipe 1, and the environmental noise at the place of measurement. Considering the fact that the frequency of environmental noise at the place of measurement is usually on a rather low level as from several tens of Hz to several hundred Hz, it suffices in general to select a frequency within the range of from several hundred Hz to 10 kHz in order to achieve a stable measurement of a length of the pipe 1.

The transmission intensity amplifier 9 amplifies the electric signal from the frequency setter 8. The transmission intensity of the sound waves to be transmitted from the oscillator 2 is set by the transmission intensity amplifier 9.

Figure 2:
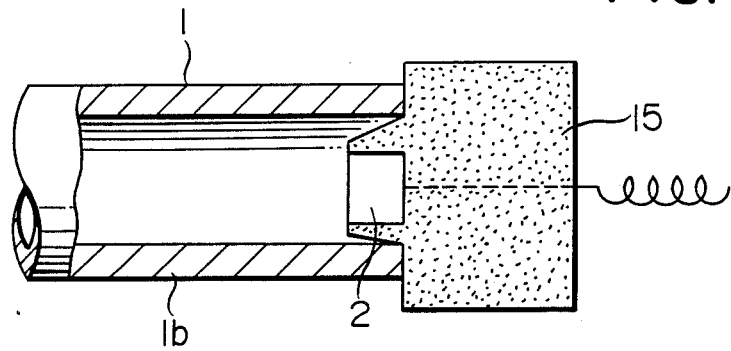
FIG. 2 is a longitudinal sectional view illustrating an installation of an oscillator of the apparatus of the first embodiment of the present invention shown in FIG. 1 to one end of the pipe.

The oscillator 2 is arranged at one end of the pipe 1 wound into a coil, and is housed in a sound absorbing block 15 fitted to the one end of the pipe 1 as shown in FIG. 2 so as to eliminate leakage of sound waves transmitted toward the interior of the pipe 1 to outside the pipe 1. The oscillator 2 comprises a wideband speaker or the like, and converts the electric signal from the frequency setter 8, which electric signal has passed through the transmission intensity amplifier 9, into sound waves having a prescribed frequency and a prescribed transmission intensity, and transmits same toward the interior of the pipe 1 for a certain period of time as described above. The sound waves transmitted toward the interior of the pipe 1 propagate through the air in the pipe 1 from the one end to the other end thereof.

The receiver 3 is arranged at the other end of the pipe 1, and is housed in a sound absorbing block (not shown) fitted to the other end of the pipe 1, as in the oscillator 2, so as to prevent sound waves caused by an environmental noise from being received. The receiver 3 comprises a microphone or the like, receives the sound waves having propagated from the one end of the pipe 1 through the air in the pipe 1 at the other end thereof, converts the received sound waves into an electric signal, and puts out same as a receiving signal. Since, as described above, the sound waves having leaked into the pipe wall 1b do not act as a noise at the other end of the pipe 1 relative to the sound waves having propagated through the air in the pipe 1, the receiving signal transmitted from the receiver 3 contains only a very slight noise signal caused by an environmental noise, except for the receiving signal which corresponds to the sound waves having propagated through the air in the pipe 1 from the one end to the other end thereof (hereinafter referred to as the "received wave signal"). The receiving signal is amplified by the amplifier 10, and then entered into the clock 4.

As required, a band-pass filter 19 for allowing only the frequency of the above-mentioned received wave signal from the receiving signal from the receiver 3 to pass through and shutting off the frequency of the noise signal caused by the environmental noise, may be arranged before or after the amplifier 10 so as to eliminate the noise signal from the receiving signal from the receiver 3. The frequency passing through the band-pass filter 19 is variable.

Figure 3:
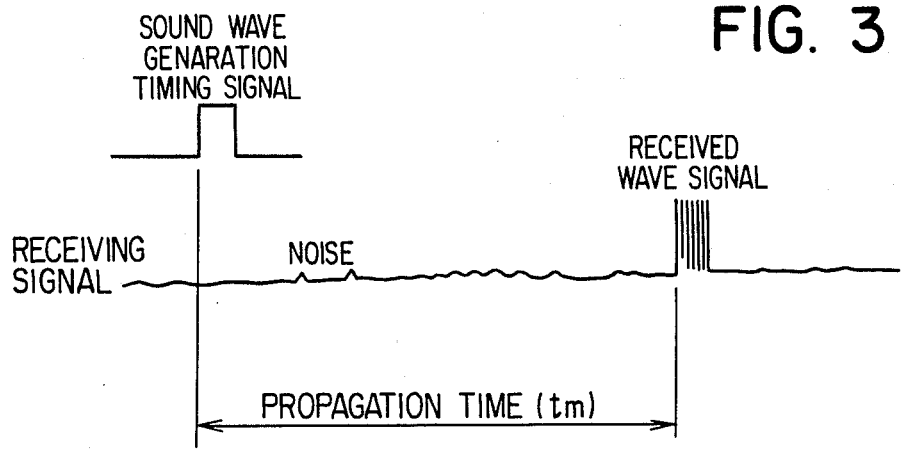
FIG. 3 is a graph conceptually illustrating a receiving signal transmitted from a receiver of the apparatus of the first embodiment of the present invention shown in FIG. 1.

When the voltage of the receiving signal from the amplifier 10, namely the receiving intensity of the sound waves is detected to be over a lower limit value of the predetermined receiving intensity, the clock 4 measures a propagation time (tm) required for the sound waves to pass through the air in the pipe 1 from the one end to the other end thereof, on the basis of the receiving signal from the amplifier 10 and the above-mentioned sound wave generation timing signal from the controller 6. More specifically, as shown in FIG. 3, the clock 4 measures the time from the positive edge of the sound wave generation timing signal (i.e., the beginning of the transmission of the sound waves) to the positive edge of the received wave signal (i.e., the beginning of the receipt of the sound waves) or the time from the negative edge of the sound wave generation timing signal (i.e., the end of the transmission of the sound waves) to the negative edge of the received wave signal (i.e., the end of the receipt of the sound waves).

The sound velocity calculator 11 and the thermometer 12 constitute a sound velocity setter for setting the propagation velocity of the sound waves in the air in the pipe 1. The thermometer 12 is arranged at an appropriate place of the pipe 1, for example at the other end portion thereof, and measures temperature of the air thereabout. A thermistor or a temperature-measuring resistor may be used as the thermometer 12. The sound velocity calculator 11 determines a propagation velocity of the sound waves in the air in the pipe 1 in accordance with the following formula (1) with the use of the temperature of the air in the pipe 1 as measured by the thermometer 12:

$$V = V_o + \alpha T = 331.5 + 0.61T \ldots \quad (1)$$

where,
V: propagation velocity of sound waves in the air in the pipe 1 (m/second),
$V_o$: propagation velocity of sound waves in the air at 0° C., which is equal to 331.5 m/second,
α: temperature coefficient of the propagation velocity of sound waves in the air, which is equal to 0.61 m/second/°C., and
T: temperature of the air in the pipe 1.

The thus determined propagation velocity of the sound waves is entered into the length calculator 5 from the sound velocity calculator 11.

When the temperature of the air in the pipe 1 may be deemed to be substantially equal to that of the air outside the pipe 1, the temperature of the air outside and near the pipe 1 may be measured to use same for the determination of the propagation velocity of the sound waves in the air in the pipe 1. Furthermore, an operator may determine the propagation velocity of the sound waves through manual calculation or by a conversion table on the basis of the temperature of the air, in which case it suffices to use a sound velocity setter provided with the function of permitting manual input of a propagation velocity of the sound waves into the length calculator 5 via a digital switch or the like.

The length calculator 5 determines a length of the pipe 1 in accordance with the following formula (2) with the use of the propagation time (tm) of the sound waves from the clock 4 and the propagation velocity (V) of the sound waves from the sound velocity calculator (11):

$$l = V \times t_m \ldots \quad (2)$$

where, l: length of the pipe 1 (m).

Following the determination of the length of the pipe 1, the length calculator 5 converts as required the thus determined length of the pipe 1 into a length at a reference temperature, on the basis of a thermal expansion coefficient of the material of the pipe 1, which has been set by the expansion coefficient setter 13, and the temperature of the air in the pipe 1, as measured by the thermometer 12. In addition, the length calculator 5 may additionally have the functions of determining an average value of a plurality of values of the length of the pipe 1 in compliance with the instruction signal from the controller 6, and of eliminating abnormal values, if any, of the length of the pipe 1.

The length of the pipe 1, as determined by the length calculator 5, is displayed on the display 14.

The clock 4, the length calculator 5, the controller 6 and the frequency setter 8 may be composed into a single small-scale computer, not with separate units.

According to the apparatus of the above-mentioned first embodiment of the present invention, the length of the pipe is determined as follows: At the one end of the pipe 1, the sound waves having a prescribed frequency and a prescribed transmission intensity are transmitted from the oscillator 2 toward the interior of the pipe 1 in synchronization with the positive edge of the sound wave generation timing signal from the controller 6, and received by the receiver 3 at the other end of the pipe 1. The propagation time required for the sound waves to pass through the air in the pipe 1 from the one end to the other end thereof is measured by the clock 4. The length of the pipe 1 is determined by the length calculator 5 on the basis of the propagation velocity of the sound waves in the air in the pipe 1 as set by the sound velocity setter and the propagation time of the sound waves as measured by the clock 4, thereby measuring the length of the pipe 1.

Figure 5:
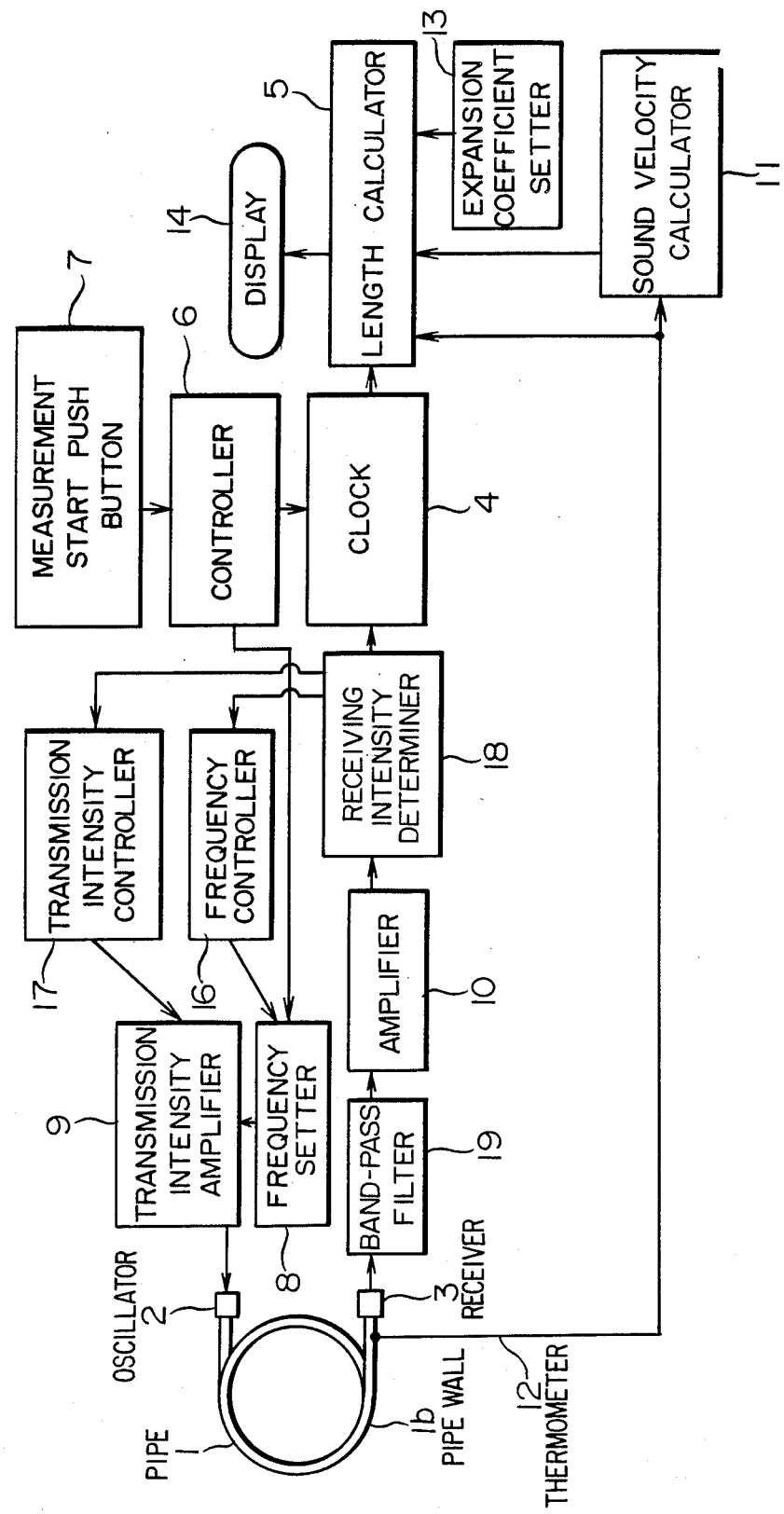
FIG. 5 is a block diagram illustrating the structure of a second embodiment of the apparatus of the present invention for determining a length of a pipe utilizing sound waves.

FIG. 5 is a block diagram illustrating the structure of a second embodiment. of the apparatus of the present invention for determining a length of a pipe utilizing sound waves. As shown in FIG. 5, the apparatus of the second embodiment of the present invention is characterized by the addition of a frequency controller 16, a transmission intensity controller 17 and a receiving intensity determiner 18 to the apparatus of the first embodiment of the present invention described above with reference to FIG. 1. The combination of the frequency controller 16 and the receiving intensity determiner 18 permits selection of a frequency of the sound waves, prior to the determination of the length of the pipe 1, which gives a prescribed receiving intensity of the sound waves while keeping constant the transmission intensity of the sound waves, without loading the receiver 3 with an excessively high receiving intensity, and the combination of the transmission intensity controller 17 and the receiving intensity determiner 18 permits selection of a transmission intensity, prior to the determination of the length of the pipe 1, which gives a prescribed receiving intensity of the sound waves while keeping constant the frequency of the sound waves, without loading the receiver 3 with an excessively high receiving intensity.

Figure 6:
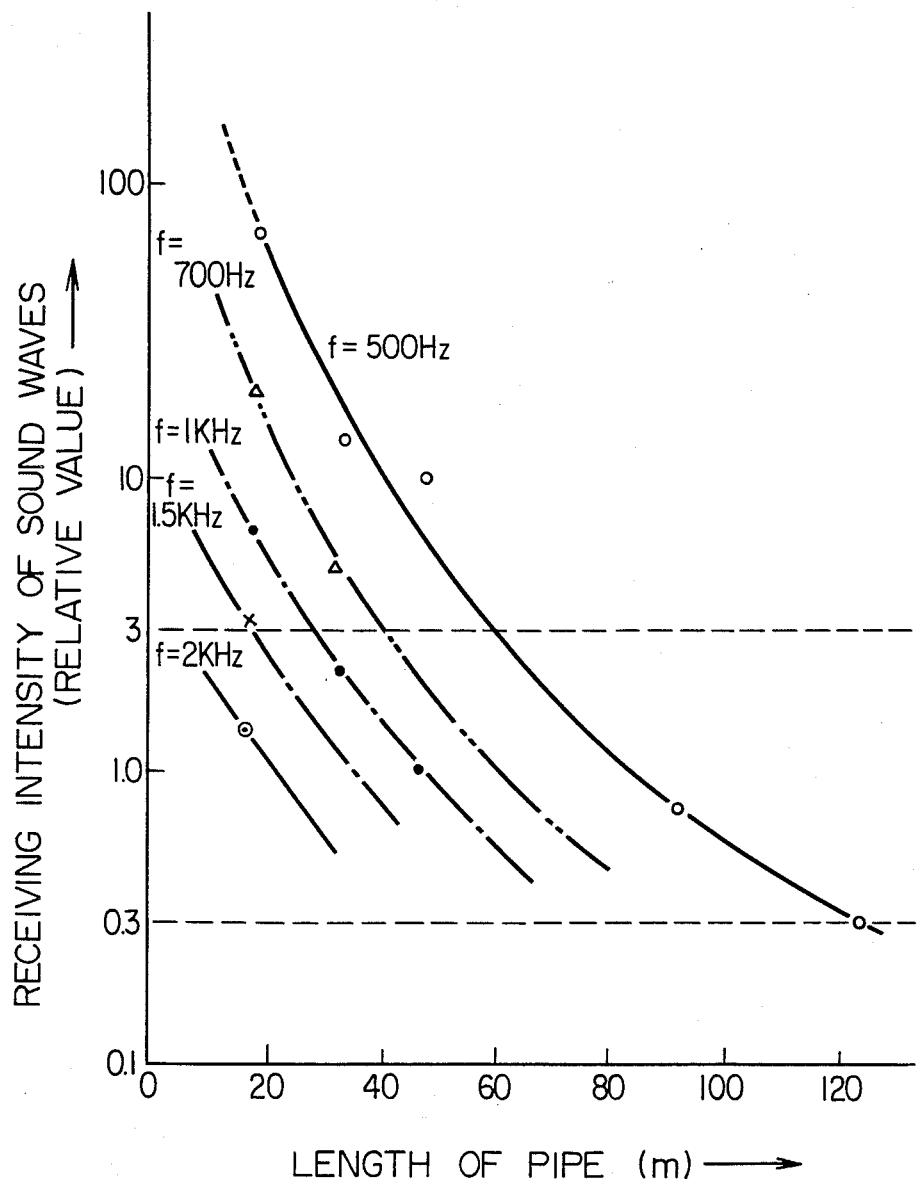
FIG. 6 is a graph illustrating the relationship between a relative value of the receiving intensity of sound waves at the other end of a pipe, which sound waves have been transmitted toward the interior of the pipe at one end thereof, while keeping constant the transmission intensity of the sound waves, on the one hand, and a length of the pipe, on the other hand, with the frequency of the sound waves as the parameter.

FIG. 6 is a graph illustrating the relationship between a relative value of the receiving intensity of sound waves at the other end of the pipe, which sound waves have been transmitted toward the interior of the pipe at one end thereof, while keeping constant the transmission intensity of the sound waves, on the one hand, and a length of the pipe, on the other hand, with the frequency of the sound waves as the parameter. The pipe used is a polyethylene pipe having an outside diameter of 25 mm wound into a coil.

As is clear from FIG. 6, the receiving intensity of the sound waves sharply decreases according as the length of the pipe increases and according as the frequency of the sound waves becomes higher. Such a receiving intensity characteristic of the sound waves transmitted toward the interior of the pipe, also depending upon the frequency characteristic of both the oscillator 2 and the receiver 3, is approximately applied to pipes of the other materials.

Suppose, for example, that the lower limit of the relative value of the receiving intensity of the sound waves necessary for detecting the sound waves is set to 0.3. In order to permit measurement of the length of the pipe having a length of 120 m, it is necessary to use the sound waves having a frequency of 500 Hz, as is known from FIG. 6. In this case, however, the relative value of the receiving intensity becomes 130, or about 430 times as high as the above-mentioned relative value of 0.3, for a pipe having a length of 10 m, and this is excessively high. Such an excessively high receiving intensity of the sound waves impairs durability of the receiver 3 and reduces the service life thereof. The detecting circuit for detecting the sound waves should have a very wide operating range, which covers the receiving intensity of at least from 0.3 to 130 in terms of relative values, or about 430 times as high as the relative value of 0.3, this making the design thereof difficult and resulting in a very expensive circuit. In order to avoid an excessively high receiving intensity of the sound waves when determining the length of a short pipe, therefore, it is necessary to use the sound waves having a higher frequency or to use the sound waves having a lower transmission intensity than in the measurement of the length of a long pipe. In order to avoid an error in the detection of the sound waves, the operating range of the detecting circuit has only to cover up to ten times the lower limit of the relative value of the receiving intensity of the sound waves, which is necessary for detecting the sound waves, for example a range of from 0.3 to 3 in terms of relative values. A tighter operating range leads to a higher detecting accuracy of the detecting circuit.

For these reasons, it is generally important, when determining the length of the pipe 1, to achieve the receiving intensity of the sound waves, which falls within a prescribed range of the receiving intensity of from 0.3 to 3 in terms of relative values for example, by adjusting the frequency or the transmission intensity of the sound waves. In the apparatus of the second embodiment of the present invention, therefore, the combination of the frequency controller 16 and the receiving intensity determiner 18 permits selection of a frequency of the sound waves, prior to the determination of the length of the pipe 1, which gives a prescribed receiving intensity of the sound waves while keeping constant the transmission intensity of the sound waves, without loading the receiver 3 with an excessively high receiving intensity, and the combination of the transmission intensity controller 17 and the receiving intensity determiner 18 permits selection of a transmission intensity, prior to the determination of the length of the pipe 1, which gives a prescribed receiving intensity of the sound waves while keeping constant the frequency of the sound waves, without loading the receiver 3 with an excessively high receiving intensity. The other aspects of the structure of the apparatus of the second embodiment of the present invention are basically the same as those in the apparatus of the first embodiment of the present invention. In FIG. 5, the same reference numerals as in FIG. 1 represent the same components as in FIG. 1.

The frequency controller 16 and the receiving intensity determiner 18 constitute a frequency selector for selecting the frequency of the sound waves, which frequency gives a prescribed receiving intensity while keeping constant the transmission intensity of the sound waves.

Figure 7:
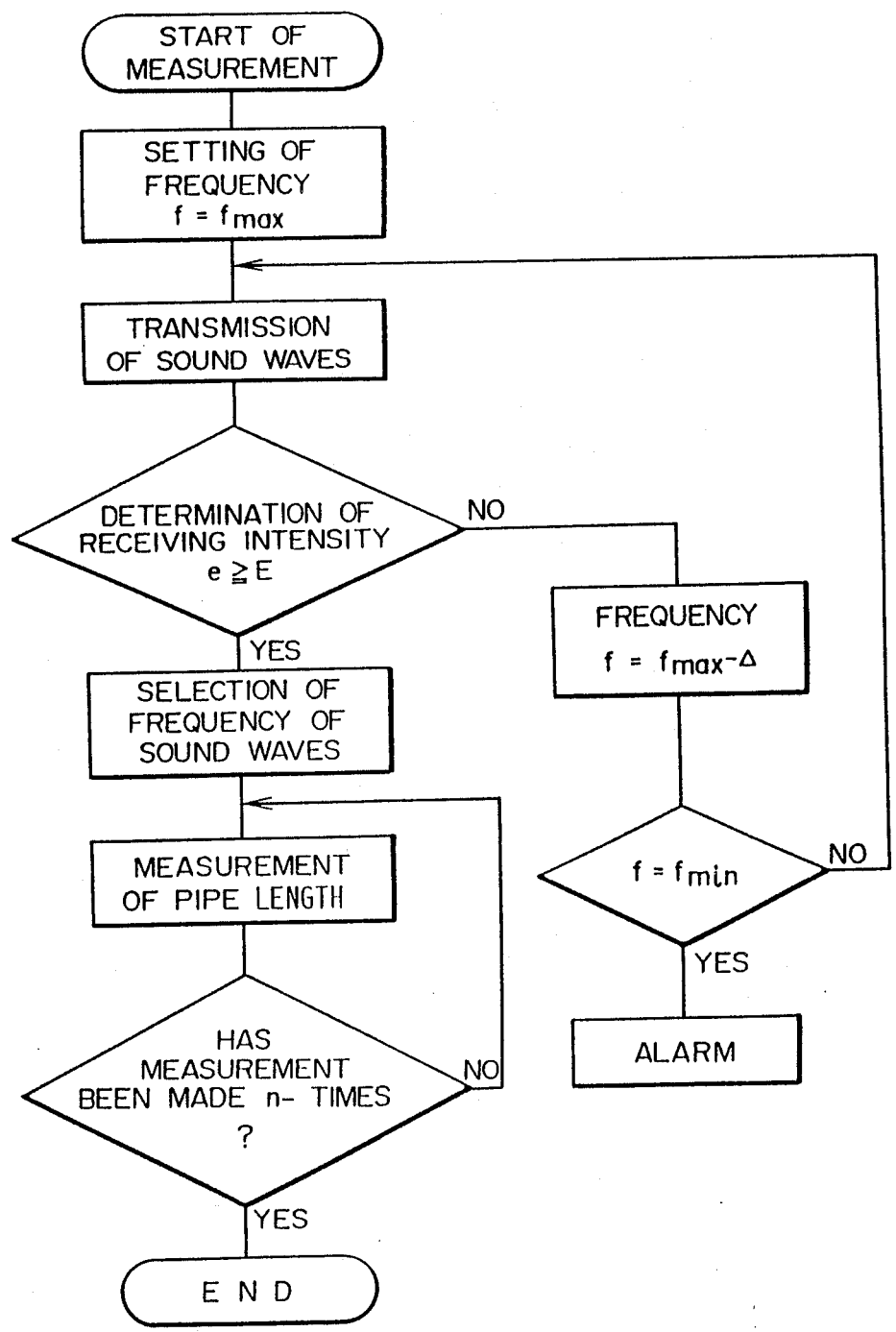
FIG. 7 is a flow chart illustrating the operation for selection of the frequency of sound waves by a frequency selector of the apparatus of the second embodiment of the present invention shown in FIG. 5.

The frequency controller 16 comprises a sequence controller for controlling the frequency setter 8. The frequency controller 16 puts out a prescribed control signal to control the frequency setter 8, and digitally and intermittently reduces, as shown in FIG. 7, the frequency "f" of the sound waves to be transmitted toward the interior of the pipe 1 from the frequency setter 8, by a prescribed decrement "Δ" at a time, starting from an appropriately determined maximum value "$f_{max}$" of the frequency. As a result, the sound waves having a frequency "f" decreased digitally and intermittently by a prescribed decrement "Δ" at a time, starting from the maximum value "$f_{max}$" of the frequency, are transmitted from the oscillator 2 at the one end of the pipe 1 toward the interior thereof, with a certain transmission intensity as amplified by the transmission intensity amplifier 9. The maximum value "$f_{max}$" of the frequency is appropriately selected, depending for example upon the estimated length of the pipe 1. The decrement "Δ" of the frequency of the sound waves does not necessarily need be constant.

According as the frequency of the sound waves transmitted toward the interior of the pipe 1 at the one end thereof is decreased, the receiving intensity of the sound waves at the other end of the pipe 1 increases. The receiving intensity determiner 18 detects the receiving intensity "e" of the sound waves every time when the receiver 3 receives the sound waves at the other end of the pipe 1, and determines whether or not the receiving intensity "e" of the sound waves has reached at least the lower limit value "E" of the range of the prescribed receiving intensity. Control of the frequency setter 8 by the frequency controller 16 is continued until the receiving intensity "e" of the sound waves reaches at least the lower limit value "E" of the range of the prescribed receiving intensity. When the receiving intensity determiner 18 determines that the receiving intensity "e" of the sound waves has reached at least the above-mentioned lower limit value "E", the receiving intensity determiner 18 sends a determination signal to that effect to the frequency controller 16 to discontinue the control of the frequency setter 8 by the frequency controller 16. As a result, the frequency of the sound waves at the moment when the receiving intensity of the sound waves has reached the range of the prescribed receiving intensity, is fixed on the frequency setter 8. The frequency of the sound waves, which gives the prescribed receiving intensity of the sound waves while keeping constant the transmission intensity of the sound waves, is thus selected without loading the receiver 3 with an excessive receiving intensity.

After the selection of the frequency of the sound waves as described above, the sound waves having the thus selected frequency with the transmission intensity used at that time, is transmitted from the oscillator 2 toward the interior of the pipe 1 to determine the length of the pipe 1. When the receiving intensity "e" of the sound waves does not reach at least the above-mentioned lower limit value "E" even with a frequency "f" of the sound waves reduced to below the minimum value "$f_{min}$" determined appropriately, malfunction of the oscillator 2 or the receiver 3, defective fitting of the oscillator 2 or the receiver 3 to the pipe 1, or improper selection of the transmission intensity of the sound waves is conceivable. In such a case, the alarm is given as shown in FIG. 7. If improper selection of the transmission intensity of the sound waves is found to be the cause, it suffices to set a higher transmission intensity of the sound waves by means of the transmission intensity amplifier 9 and carry out the above-described operation to reduce the frequency of the sound waves having a higher transmission intensity thus set.

The transmission intensity controller 17 and the receiving intensity determiner 18 constitute a transmission intensity selector for selecting the transmission intensity of the sound waves, which transmission intensity gives a prescribed receiving intensity of the sound waves while keeping constant the frequency of the sound waves. The transmission intensity selector and the above-mentioned frequency selector are alternatively used. Selection of the transmission intensity of the sound waves by the transmission intensity selector is conducted in the same manner as in the selection of the frequency of the sound waves by the frequency selector.

The transmission intensity controller 17 comprises a sequence controller for controlling the transmission intensity amplifier 9. The transmission intensity controller 17 puts out a prescribed control signal to control the transmission intensity amplifier 9, and digitally and intermittently increases the transmission intensity of the sound waves to be transmitted toward the interior of the pipe 1 from the transmission intensity amplifier 9, by a prescribed increment at a time, starting from an appropriately determined minimum value of the transmission intensity. As a result, the sound waves having a transmission intensity increased digitally and intermittently by a prescribed increment at a time, starting from the minimum value of the transmission intensity, are transmitted from the oscillator 2 at the one end of the pipe 1 toward the interior thereof, with a constant frequency from the frequency setter 8. The minimum value of the transmission intensity is appropriately selected, depending for example upon the estimated length of the pipe 1. The increment of the transmission intensity of the sound waves does not necessarily need the constant.

According as the transmission intensity of the sound waves transmitted toward the interior of the pipe 1 at the one end thereof is increased, the receiving intensity of the sound waves at the other end of the pipe 1 increases. The receiving intensity determiner 18 detects the receiving intensity "e" of the sound waves every time when the receiver 3 receives the sound waves at the other end of the pipe 1, and determines whether or not the receiving intensity "e" of the sound waves has reached at least the lower limit value "E" of the range of the prescribed receiving intensity. Control of the transmission intensity amplifier 9 by the transmission intensity controller 17 is continued until the receiving intensity "e" of the sound waves reaches at least the lower limit value "E" of the range of the prescribed receiving intensity. When the receiving intensity determiner 18 determines that the receiving intensity "e" of the sound waves has reached at least the abovementioned lower limit value "E", the receiving intensity determiner 18 sends a determination signal to that effect to the transmission intensity controller 17 to discontinue the control of the transmission intensity amplifier 9 by the transmission intensity controller 17. As a result, the transmission intensity of the sound waves at the moment when the receiving intensity of the sound waves has reached the range of the prescribed receiving intensity, is fixed on the transmission intensity amplifier 9. The transmission intensity of the sound waves, which gives the prescribed receiving intensity of the sound waves while keeping constant the frequency of the sound waves, is thus selected without loading the receiver 3 with an excessive receiving intensity.

After the selection of the transmission intensity of the sound waves as described above, the sound waves having the thus selected transmission intensity with the frequency used at that time, is transmitted from the oscillator 2 toward the interior of the pipe 1 to determine the length of the pipe 1. When the receiving intensity "e" of the sound waves does not reach at least the abovementioned lower limit value "E" even with a transmission intensity of the sound waves increased to over the maximum value determined appropriately, malfunction of the oscillator 2 or the receiver 3, defective fitting of the oscillator 2 or the receiver 3 to the pipe 1, or improper selection of the frequency of the sound waves is conceivable. In such a case, the alarm is given. If improper selection of the frequency of the sound waves is found to be the cause, it suffices to set a lower frequency of the sound waves by means of the frequency setter 8 and carry out the above-mentioned operation to increase the transmission intensity of the sound waves having a lower frequency thus set.

As required, a band-pass filter 19 for allowing only the frequency of the above-mentioned received wave signal corresponding to the sound waves of the receiving signal from the receiver 3 to pass through and shutting off the frequency of noise signal caused by the environmental noise, may be arranged before or after the amplifier 10 so as to eliminate the noise signal from the receiving signal from the receiver 3. The frequency passing through the band-pass filter 19 is variable. When employing the frequency selector, the above-mentioned frequency controller 16, which is a component of the frequency selector, controls the frequency passing through the band-pass filter 19 in synchronization with the control of the frequency setter 8 to permit change of the frequency passing through the band-pass filter 19 in synchronization with the frequency of the sound waves from the frequency setter 8.

Only any one of the frequency controller 16 and the transmission intensity controller 17 may be provided. The frequency controller 16, the transmission intensity controller 17 and the receiving intensity determiner 18 may be composed into a single small-scale computer, not with separate units, together with the clock 4, the length calculator 5, the controller 6 and the frequency setter 8.

According to the apparatus of the above-mentioned second embodiment of the present invention, the length of the pipe 1 is determined as follows:

When selecting the frequency of the sound waves to be used prior to the determination of the length of the pipe 1, the sound waves having the frequency reduced digitally and intermittently are transmitted with a constant transmission intensity from the oscillator 2 at the one end of the pipe 1 toward the interior thereof and received by the receiver 3 at the other end of the pipe 1, as described above. The frequency of the sound waves at the moment when the receiving intensity of the thus received sound waves has reached the range of the prescribed receiving intensity, is selected as the frequency of the sound waves to be used for determination of the length of the pipe 1. After once the frequency of the sound waves is thus selected, the length of the pipe 1 is determined with the use of the sound waves having the thus selected frequency in the same manner as in the apparatus of the first embodiment of the present invention.

When selecting the transmission intensity of the sound waves to be used prior to the determination of the length of the pipe 1, the sound waves having the transmission intensity increased digitally and intermittently are transmitted with a constant frequency from the oscillator 2 at the one end of the pipe 1 toward the interior thereof and received by the receiver 3 at the other end of the pipe 1, as described above. The transmission intensity of the sound waves at the moment when the receiving intensity of the thus received sound waves has reached the range of the prescribed receiving intensity, is selected as the transmission intensity of the sound waves to be used for the determination of the length of the pipe 1. After once the transmission intensity of the sound waves is thus selected, the length of the pipe 1 is determined with the use of the sound waves having the thus selected transmission intensity in the same manner as in the apparatus of the first embodiment of the present invention.

EXAMPLE

The length of a polyethylene pipe having an outside diameter of 25 mm, wound into a coil, the length of which had been known to be 90.5 m, as the pipe 1 was determined using the apparatus of the first embodiment of the present invention as described above with reference to FIG. 1. The sound waves used for the determination had a waveform of sine wave with a maximum frequency of 700 Hz. The sound waves were transmitted toward the interior of the pipe 1 for a period of 0.2 seconds. The air near the pipe 1 at the time of measurement had a temperature of 20° C.

As a result, both the time from the beginning of transmission of the sound waves to the beginning of receiving thereof, and the time from the end of transmission of the sound waves to the end of receiving thereof were measured to be 0.264 seconds as the propagation time "tm" of the sound waves, resulting in the determination of a length "l" of the pipe 1 of 90.74 m which has a sufficiently high accuracy as compared with the true length of the pipe 1 of 90.5 m and poses practically no problem. The reproducibility of this determined value was confirmed even through about 100 repeated measurements.

According to the present invention, as described above, it is possible to determine easily and at a high accuracy a length of a pipe such as a plastic pipe, irrespective of whether the pipe is straight or wound into a coil.

What is claimed is:

1. In a method for determining a length of a pipe utilizing sound waves, comprising the steps of:
   transmitting sound waves having a prescribed frequency and a prescribed transmission intensity toward the interior of a pipe at one end of the length of said pipe;
   receiving said transmitted sound waves at the other end of said pipe;
   measuring a propagation time required for said sound waves to pass through the air in said pipe from said one end to said other end thereof;
   measuring a temperature of the air in said pipe; and
   determining a length of said pipe on the basis of a propagation velocity of said sound waves determined on the basis of said measured temperature of the air in said pipe and said measured propagation time of said sound waves;
   the improvement comprising:
   digitally and intermittently reducing said frequency of said sound waves transmitted toward the interior of said pipe while keeping constant said transmission intensity of said sound waves; and
   selecting said frequency of said sound waves transmitted toward the interior of said pipe so that a receiving intensity of said sound waves at said other end of said pipe falls within the range of a prescribed receiving intensity.

2. In a method for determining a length of a pipe utilizing sound waves, comprising the steps of:
   transmitting sound waves having a prescribed frequency and a prescribed transmission intensity toward the interior of a pipe at one end of the length of said pipe;
   receiving said transmitted sound waves at the other end of said pipe;
   measuring a propagation time required for said sound waves to pass through the air in said pipe from said one end to said other end thereof;
   measuring a temperature of the air in said pipe; and
   determining a length of said pipe on the basis of a propagation velocity of said sound waves determined on the basis of said measured temperature of the air in said pipe and said measured propagation time of said sound waves;
   the improvement comprising:
   digitally and intermittently increasing said transmission intensity of said sound waves transmitted toward the interior of said pipe while keeping constant said frequency of said sound waves; and
   selecting said transmission intensity of said sound waves transmitted toward the interior of said pipe so that a receiving intensity of said sound waves at said other end of said pipe falls within the range of a prescribed receiving intensity.

3. An apparatus for determining a length of a pipe utilizing sound waves, comprising:
- oscillator means (2) for transmitting sound waves having a prescribed frequency and a prescribed transmission intensity toward the interior of a pipe at one end of the length of said pipe;
- transmission intensity amplifier means (9), coupled to said oscillator means (2), for setting said transmission intensity of said sound waves;
- frequency setter means (8), coupled to said transmission intensity amplifier means (9), for setting said frequency of said sound waves;
- receiver means (3) for receiving said sound waves from said oscillator means (2) at the other end of said pipe, which sound waves have passed through the air in said pipe from said one end to said other end thereof, and for converting said received sound waves into an electrical signal to output same;
- clock means (4), coupled to said receiver means (3), for measuring a propagation time required for said sound waves to pass through the air in said pipe from said one and to said other end thereof;
- sound velocity setter means for setting said propagation velocity of said sound waves, said sound velocity setter means comprising a thermometer means (12) arranged closely adjacent to said pipe for measuring a temperature of the air in said pipe, and a sound velocity calculator means (11) coupled to said thermometer means (12) for determining said propagation velocity of said sound waves on the basis of said measured temperature of the air; and
- length calculator means (5), coupled to both of said clock means (4) and said sound velocity calculator means (11), for determining a length of said pipe on the basis of a propagation velocity of said sound waves set by said sound velocity setter means in the air in said pipe and said measured propagation time of said sound waves; and
- frequency selector means for selecting said frequency of said sound waves, which frequency gives a prescribed receiving intensity of said sound waves while keeping constant said transmission intensity of said sound waves, said frequency selector means comprising:
  - frequency controller means (16), coupled to said frequency setter means (8), for digitally and intermittently reducing said frequency of said sound waves from said frequency setter means (8) to be transmitted toward the interior of said pipe; and
  - receiving intensity determining means (18), coupled to said frequency controller means (16), for determining whether or not a receiving intensity of said sound waves at said other end of said pipe has reached said prescribed receiving intensity.

4. The apparatus as claimed in claim 3, wherein: said apparatus additionally includes a band-pass filter means (19), the frequency pass band of which is variable, for allowing only a frequency of said electrical signal from said receiver means (3), which frequency corresponds to said frequency of said sound waves, to pass through, and for blocking noise signal frequencies caused by environmental noise, and said band-pass filter means (19) being arranged between said receiver means (3) and said clock means (4).

5. An apparatus for determining a length of a pipe utilizing sound waves, comprising:
- oscillator means (2) for transmitting sound waves having a prescribed frequency and a prescribed transmission intensity toward the interior of a pipe at one end of the length of said pipe;
- transmission intensity amplifier means (9), coupled to said oscillator means (2), for setting said transmission intensity of said sound waves;
- frequency setter means (8), coupled to said transmission intensity amplifier means (9), for setting said frequency of said sound waves;
- receiver means (3) for receiving said sound waves from said oscillator means (2) at the other end of said pipe, which sound waves have passed through the air in said pipe from said one end to said other end thereof, and for converting said received sound waves into an electrical signal to output same;
- clock means (4), coupled to said receiver means (3), for measuring a propagation time required for said sound waves to pass through the air in said pipe from said one end to said other end thereof;
- sound velocity setting means for setting said propagation velocity of said sound waves, said sound velocity setter means comprising a thermometer means (12) arranged closely adjacent to said pipe for measuring a temperature of the air in said pipe, and a sound velocity calculator means (11) coupled to said thermometer means (12) for determining said propagation velocity of said sound waves on the basis of said measured temperature of the air; and
- length calculator means (5), coupled to both of said clock means (4) and said sound velocity calculator means (11), for determining a length of said pipe on the basis of a propagation velocity of said sound waves set by said sound velocity setter means in the air in said pipe and said measured propagation time of said sound waves; and
- transmission intensity selector means for selecting said transmission intensity of said sound waves, which transmission intensity of said sound waves, which transmission intensity gives a prescribed receiving intensity of said sound waves while keeping constant said frequency of said sound waves, said transmission intensity selector means comprising:
  - transmission intensity controller means (17), coupled to said transmission intensity amplifier means (9), for digitally and intermittently increasing said transmission intensity of said sound waves from said transmission intensity amplifier means (9) to be transmitted toward the interior of said pipe; and
  - receiving intensity determining means (18), coupled to said transmission intensity controller means (17), for determining whether or not a receiving intensity of said sound waves at said other end of said pipe has reached said prescribed receiving intensity.

6. The apparatus as claimed in claim 5, wherein: said apparatus additionally includes a band-pass filter means (19), the frequency pass band of which is variable, for allowing only a frequency of said electrical signal from said receiver means (3), which frequency corresponds to said frequency of said sound waves, to pass through, and for blocking noise signal frequencies caused by environmental noise, and said band-pass filter means (19) being arranged between said receiver means (3) and said clock means (4).

* * * * *

UNITED STATES PATENT AND TRADEMARK OFFICE
CERTIFICATE OF CORRECTION

PATENT NO. : 4,852,407                  Page 1 of 3

DATED : August 1, 1989

INVENTOR(S) : KOMINE et al

It is certified that error appears in the above-identified patent and that said Letters Patent is hereby corrected as shown below:

```
Column 12, Claim 1, line 27:
   after "waves", insert --in the air in said pipe,--
Column 12, Claim 1, line 28:
   after "temperature", insert --,--;
Column 12, Claim 1, lines 28-29:
   delete "of the air in said pipe";
Column 12, Claim 2, line 55:
   after "waves", insert --in the air in said pipe,--;
Column 12, Claim 2, line 56:
   after "temperature", insert --,--;
Column 12, Claim 2, lines 56-57:
   delete "of the air in said pipe";
Column 13, Claim 3, line 24:
   change "said propaga-" to --a propaga- --;
Column 13, Claim 3, line 26:
   delete "a" before "thermometer";
Column 13, Claim 3, line 29:
   delete "a" before "sound";
Column 13, Claim 3, line 33:
   delete "and";
```

UNITED STATES PATENT AND TRADEMARK OFFICE
CERTIFICATE OF CORRECTION

PATENT NO. : 4,852,407
DATED : August 1, 1989
INVENTOR(S) : KOMINE et al

It is certified that error appears in the above-identified patent and that said Letters Patent is hereby corrected as shown below:

```
Column 13, Claim 3, line 36:
    change "a" before "propagation" to --said--;
Column 12, Claim 3, line 37:
    after "waves", insert --in the air in said pipe,--;

Column 13, Claim 3, lines 37-38:
    delete "in the air in said pipe";

Column 14, Claim 5, line 21:
    change "said propaga-" to --a propaga- --;
Column 14, Claim 5, line 23:
    delete "a" before "thermometer";
Column 14, Claim 5, line 26:
    delete "a" before "sound";
Column 14, Claim 5, line 30:
    delete "and";
Column 14, Claim 5, line 34:
    change "a" before "propagation" to --said--;
Column 14, Claim 5, line 35:
    after "waves", insert --in the air in said pipe,--;
```

UNITED STATES PATENT AND TRADEMARK OFFICE
CERTIFICATE OF CORRECTION

PATENT NO. : 4,852,407

DATED : August 1, 1989

INVENTOR(S) : KOMINE et al

It is certified that error appears in the above-identified patent and that said Letters Patent is hereby corrected as shown below:

```
Column 14, Claim 5, lines 35-36:
    delete "in the air in said pipe";
Column 14, Claim 5, line 39:
    delete "which transmission intensity of said sound
    waves," and
```

Signed and Sealed this

Eighth Day of January, 1991

Attest:

HARRY F. MANBECK, JR.

*Attesting Officer*   *Commissioner of Patents and Trademarks*